United States Patent Office

3,211,569
Patented Oct. 12, 1965

3,211,569
PHENOLIC COMPOUND MODIFIED
MAGNESIAS
Richard A. Patton, Arlington Heights, Ill., assignor to Morton Salt Company, Chicago, Ill., a corporation of Delaware
No Drawing. Filed Apr. 10, 1962, Ser. No. 186,369
9 Claims. (Cl. 106—308)

This invention relates to novel magnesium oxide compositions and more specifically to organically modified magnesias, and to methods of producing the same.

The products of the present invention have utility as reinforcing fillers in a variety of organic polymeric and elastomeric materials. They are more compatible with organic materials than the unmodified magnesia and therefore lend themselves to ease of incorporation into organics. In some instances, certain phenolic compounds used in the modification of magnesias result in a product which has a dual function in elastomer processing, namely as a filler and as an accelerator or curing aid. This latter class of organically modified magnesias has properties which produce results that differ substantially from those obtained by the use of the components per se.

Magnesium oxide, or more conventionally magnesia, is a well known commodity of commerce. Magnesia may be prepared from a number of natural minerals. Magnesite (magnesium carbonate) may be calcined directly to magnesia. When this is done, a high density magnesium oxide of coarse particle size results. Brucite, naturally occurring magnesium hydroxide, may also be calcined directly to magnesium oxide. Once again high density, coarse particle magnesium oxide results. Dolomite, because of the presence of calcium oxide, requires treatment to separate the alkaline oxides after calcining. This may be done by treatment of the quicklime with carbon dioxide to solubilize the magnesium component as the bicarbonate. Filtration and washing will then produce a liquor which may, by heat, be decomposed to a basic carbonate. The basic carbonate may then be calcined to magnesium oxide. This is the process that has been employed to produce insulating magnesia.

The production of magnesium oxide made from sea water or brine involves the lime treatment of the magnesium-containing solution. A high calcium lime will precipitate magnesium hydroxide producing a soluble salt of the calcium in the process. The calcium oxide component of the dolomite will react with soluble magnesium chloride to produce insoluble magnesium hydroxide and soluble calcium chloride. While it is possible to produce a high surface area of magnesia from naturally occurring materials, the highest surface areas and the most reactive magnesias are produced by calcination of precipitated fine particle materials. They may be either magnesium carbonate or magnesium hydroxide. For purposes of this invention, any active magnesia, regardless of origin, is a suitable raw material. It is preferred however to employ the finer particle size precipitated materials.

If the calcination step is carried out at more moderate temperatures, the product produced is less crystalline and more amorphous in character than periclase. This magnesia may be used in a variety of industrial applications, such as a curing aid for elastomers, the manufacture of cements, metal coatings and other well known uses. The product may be characterized as a lightly calcined magnesia.

It has been found that many of the lightly calcined magnesias of commerce have unusual properties which are not common to the hard calcined periclase or the starting materials from which magnesias are prepared, namely the hydroxide or the carbonate. One characteristic of these lightly calcined magnesias is the ability to adsorb iodine. It has been found that magnesias having an iodine adsorption value of from 10 to about 300 milligrams per gram are capable of reacting with certain broad classes of organic compounds to produce an organically modified magnesia. The reactivity of these magnesias is highly unexpected in view of the fact that the starting material, such as magnesium hydroxide, is unreactive with respect to these organic compounds. Magnesias having iodine adsorption values below 10, such as periclase are also unreactive.

Inasmuch as magnesia as such is often used in conjunction with organic or hydrocarbon derived materials, it would be desirable, if a product could be produced which would modify the purely inorganic characteristics of magnesia, to produce a material which is more compatible with organic compositions.

Accordingly, in one broad form, the compositions of the present invention are prepared by a process comprising contacting a lightly calcined magnesium oxide or magnesia having an iodine adsorption number of from about 10 to 300 with an aryl hydroxy compound containing up to 18 carbon atoms.

The magnesia starting material is a commercially available product which is sold under a variety of trade names. Magnesium carbonate derived magnesias are sold by the Morton Chemical Company as the 57 series A through G. The magnesium hydroxide derived magnesias are sold under the trade name Elastomag.

As indicated in the foregoing, the magnesia starting materials of the present invention have an iodine adsorption number or value of from about 10 to about 300 milligrams of iodine per gram of dry magnesium oxide, and in the most preferred instance have an iodine number of from about 15 to about 220. The iodine number as referred to herein is determined by the following procedure:

METHOD OF IODINE NUMBER DETERMINATION (1) Weigh a 2 gram sample of magnesium oxide to the nearest milligram.

(2) Transfer to a clear, dry, 200 ml. glass-stoppered bottle.

(3) Add 100±0.2 ml. of 0.100 N iodine in carbon tetrachloride, free from traces of sulfur or carbon disulfide.

(4) Stopper the bottle and shake vigorously at ambient temperature in a suitable shaking device for 30 minutes (the test is relatively insensitive to temperature so that no temperature controls are employed).

(5) Allow to settle for 5 minutes and then pipette a 20 ml. aliquot of the clear solution into a 250 ml. Erlenmeyer flask containing 50 ml. of 0.03 N potassium iodide in 75 percent ethanol.

(6) Titrate the 20 ml. aliquot with standard 0.05 N sodium thiosulfate. The sodium thiosulfate should be standardized at least once every two weeks against a standard potassium iodate solution. A sharp end point is obtained without the use of starch indicator.

(7) Calculate idodine number in terms of milligrams of iodine per gram of sample according to the following equation:

$$(V_2 - V_1)\frac{127 \times N_1}{0.4} = \text{mg. 1/g.} = \text{iodine number}$$

where $V_2$ is the volume of thiosulfate equivalent to 20 ml. of the original iodine solution—before adsorption of iodine by the oxide; where $V_1$ is the volume of thiosulfate required by the 20 ml. aliquot after the adsorption; and $N_1$ is the normality of the thiosulfate solution.

Broadly, the phenols which are useful in the process of the present invention include phenol, substituted phenols, polyhydric phenols and polyaryl phenols. The substituted phenols include alkyl phenols, alkenyl phenols, alkoxy phenols, halophenols, aminophenols, nitrophenols. Polyaryl phenols include alpha and beta naphthol, halonaphthol, alkylnaphthols, phenyl-phenols, and the like. The substituted phenols may contain one or more substituent groups which may be the same or different. The following formula is exemplary of such compounds:

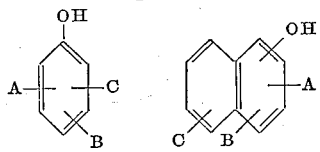

wherein A, B and C may be the same or different and are selected from the group consisting of hydrogen, hydroxy, halogen, lower alkyl, lower alkenyl, aryl, lower alkoxy, aryloxy, nitro and amino.

Exemplary specific compounds illustrative of the foregoing classes are: phenol, ortho, meta and para cresol, ortho-tertiarybutylphenol, 3,5-dimethylphenol, isopropylphenol, allyl and diallyphenol, guiacol, eugenol, isoeugenol, p-chlorophenol, p-bromophenol, 2,4,6-trichlorophenol, pentachlorophenol, p-nitrophenol, 1,5-dinitrophenol, picric acid, phloroglucinol catechol, resorcinol, pyrogallol, hydroquinone, p-hydroxy biphenyl, o-hydroxy biphenyl, β-naphthol, 2-amino-1-naphthol, 2,4-dichloro-1-naphthol, 1-methyl-2-naphthol, and 2,4-dinitro-1-naphthol.

The phenols or aryl hydoxy compounds used in the process of this invention may contain up to 18 carbon atoms and preferably from 6 to 10 carbon atoms.

The products of the present invention may be prepared as indicated above by contacting a lightly calcined magnesia, as above defined, with a phenol of the class previously defined. Generally the reaction takes place from about 0° to about 225° C., but is preferably carried out at temperatures of from about 65° C. to about 170° C. If desired, the process may be carried out in conjunction with an inert solvent, such as benzene, toluene, heptane, octane, xylene, carbon tetrachloride, or the like. Non-polar solvents are preferred. In some instances liquid phenolic reactants may be used as the reaction media. Refluxing is one convenient method of carrying out the reaction.

It is preferred to use an excess of the phenol in the reaction, and a molar excess of at least 10% over the amount of phenolic compound sought to be introduced is preferred. It should be understood that larger excess amounts of phenolic compound may be used in the process of this invention and the excess unreacted starting material recovered after the reaction is complete.

The reaction time is not critical, and periods of time ranging from about ½ hour to 80 hours may be employed depending on the mode of reaction. Ordinarily the reaction proceeds at a higher rate at the more elevated temperatures. The extent of reaction, that is, the amount of phenol that may be introduced, varies with the iodine number of the magnesia, the character of the phenol compounds both as to reactivity and molecular weight, and the physical state of the magnesium oxide (particle size). Generally it has been found that passing the reaction mixture through a colloid mill or homogenizer results in appreciably more reaction and consequently a greater percentage of organic material in the magnesia product. The "wet batch" procedure (reflux or heating in an organic fluid [solvent] medium) usually results in complete reaction in from about ½ to 3 hours.

In some instances water is evolved in the reaction process, and the degree of reaction between the inorganic magnesia substrate and the phenolic compound determined or monitored by observing the water recovered from the reaction mixture. This may be conveniently measured by using inert solvents which azeotrope with water, and recovering the water in a Dean-Stark trap. In some instances the extent of reaction is considerably greater than the water recovered would indicate.

When the reaction is complete, as may be determined in some instances by the cessation of the evolution of water, the reaction product is recovered by filtration and washed with a volatile inert solvent to remove any excess organic reactant. Solvents for washing may be any inert material substantially of the same type as are used for the reaction medium. After washing, the filter cake is dried, preferably at temperatures of from between about 65 and 100° C., and pulverized into a powder.

The products of the present invention may also be prepared by means of a fluidized bed technique wherein a pulverized lightly calcined magnesium oxide reactant is placed in a fluid bed apparatus and a vaporized phenolic reactant carried into and through the fluidized bed by the fluidizing gas stream. Excess organic vapors may be stripped from the fluidized magnesium oxide in the same apparatus, if desired. In utilizing fluid bed techniques the magnesium oxide does not need to be separated from solvent, washed or dried, as in the case of the "wet batch" technique. Generally the same temperatures are useful in fluidized bed technique as in the solvent system or "wet batch" technique using a liquid reaction medium. The temperature employed will usually depend upon the boiling point of the phenolic reactant or its partial pressure in the fluidizing gas system. While the over-all time of the reaction in fluid bed operations carried out at these temperatures is from about ½ to 80 hours, a preferred time is from 10 to 60 hours. The following specific examples will further illustrate the process for producing the compositions of the present invention.

*Example 1*

Into a 3-liter 3-necked flask, equipped with a thermometer, stirrer and reflux condenser with attached Dean-Stark trap, was placed 1.5 liters dry toluene and 27.5 grams of catechol. The contents of the flask were heated and agitated until solution was complete. To the resulting solution was added 230 grams of dry lightly calcined magnesium oxide with stirring and the contents of the flask heated to reflux (78–79° C.). The reaction mixture was stirred and heated at reflux. Water of reaction was collected and measured in the Dean-Stark trap during the reaction period. The reaction was considered complete when water was no longer evolved from the reaction mixture. The product was recovered by filtering the mixture through a Buchner funnel with vacuum. The filter cake was washed with hot benzene. The washed filter cake was allowed to air dry at 80° C. for a brief period. The filtrate was evaporated to dryness and the unreacted catechol recovered.

The following table will illustrate the results obtained in two runs:

TABLE I

| | Run A | Run B |
|---|---|---|
| Magnesium oxide, grams | 230 | 230 |
| Magnesium oxide activity (Mg. I₂/gram MgO) | 170 | 100 |
| Catechol charged, grams | 27.5 | 11.0 |
| Catechol recovered, grams | | 0.4 |
| Catechol reacted, grams | 27.5 | 10.6 |
| Weight of product, grams | 256.5 | 236.7 |
| Percent organic in product | 11.94 | 4.5 |
| Reaction time, hours | 3.0 | 3.0 |
| Weight of water recovered, grams[1] | 6.3 | 4.1 |
| Net water recovered, grams[2] | 3.5 | 1.6 |

[1] Gross water during reaction period.
[2] After subtraction of water recovered in blank experiment using only magnesium oxide.

While the foregoing example was specific to the use of organic solvents, it should be understood that fluid bed techniques may also be used. It is preferred to carry out the process of this invention under substantially anhydrous conditions. Of course, water present in the reaction mixture initially is removed by the azeotropic distillation of the wet batch solvent technique.

The following table will illustrate the production of organically modified magnesias, using various phenols by the method described above.

TABLE II

| Ex. | Magnesium Oxide | | Phenol | | Water Evolved, Grams | | | Reaction Conditions | | | Weight Percent Organic In Product |
|---|---|---|---|---|---|---|---|---|---|---|---|
| | Amount, Grams | Iodine No. | Type | Amount, Grams | Total | Blank | Net | Time (hrs.) | Temp. (°C.) | Solvent | |
| 2 | 230 | 170 | Resorcinol | 44.0 | 3.2 | 2.3 | 1.0 | 3 | 117 | Toluene | 13.6 |
| 3 | 230 | 170 | Phloroglucinol | 12.6 | 7.5 | 7.0 | 0.5 | 4 | 117 | ____do____ | 5.4 |
| 4 | 230 | 170 | ____do____ | 50.3 | 16.5 | | | 4 | 117 | ____do____ | 18.0 |
| 5 | 230 | 170 | p-Aminophenol | 21.8 | 4.3 | 3.0 | 1.3 | 3 | 117 | ____do____ | 8.7 |
| 6 | 230 | 170 | Phenol | 37.6 | 3.6 | 3.0 | 0.6 | 3 | 117 | ____do____ | 8.0 |
| 7 | 230 | 170 | Hydroquinone | 11.0 | 4.2 | 3.2 | 1.0 | 3 | 117 | ____do____ | 6.22 |
| 8 | 230 | 170 | ____do____ | 22.0 | 5.0 | 3.2 | 1.8 | 3 | 117 | ____do____ | 10.22 |

The organically modified magnesias of the present invention contain from about 1 to 35 percent organic material, and preferably from about 2.5 to about 25 percent organic material.

The following examples will illustrate the usefulness of the compositions of this invention in the curing of elastomeric compositions.

*Example 9*

A catechol-magnesia adduct was incorporated into a neoprene elastomer vulcanizing stock to demonstrate the use of this composition as a rubber accelerator. It is well known that catechol used alone as an accelerator is of very limited usefulness due to its tendency to scorch. The reduction of this tendency in the product of this invention may be seen from the following data.

Vulcanizing stock:
  Polychloroprene (Neoprene W, Du Pont) _____ 100 parts.
  Stearic acid _____ 1 part.
  Neozone A _____ 2 parts.
  Carbon black _____ 29 parts.
  Zinc oxide _____ 5 parts.
  Magnesia _____ As indicated.
  Accelerator _____ As indicated.

An adduct of catechol 0.53 part and magnesia (iodine No. 170) 4.0 parts was prepared by the procedure of Example 1. This adduct was incorporated into the vulcanizing stock in an amount of 4.5 percent. This stock was identified as Stock A. For purposes of comparison a mixture of 4.0 parts magnesia (iodine No. 170) and 0.53 part catechol was incorporated into the basic stock which was idenified as Stock B. The Mooney scorch time (minutes to a 10 point rise) ASTM–D–1646–61 was determined in both stocks. The following results were obtained.

Stock:                   Mooney scorch time (minutes)
  A _____ 14
  B (control) _____ 9

From the above it will be observed that Stock A had a Mooney scorch time about 55 percent greater than Stock B containing the mixture of materials. This unexpected increase in process safety permits the use of a material that heretofore was very difficult to handle in the vulcanizing process. Similar results were obtained in the use of resorcinol-magnesia adducts as indicated in the following:

| | C (parts) | D (parts) |
|---|---|---|
| Neoprene W | 100 | 100 |
| Neozone A | 2 | 2 |
| Stearic acid | 1 | 1 |
| Carbon black | 29 | 29 |
| Zinc oxide | 5 | 5 |
| Magnesia (1) | 4.0 ⎫ (3) | 4.0 ⎫ (2) |
| Resorcinol | 0.6 ⎭ | 0.6 ⎭ |

(1) Iodine No. 170.
(2) As adduct containing 13.5% resorcinol (see Example 2).
(3) As a mixture (control).

The following results were obtained.

Stock:                   Mooney scorch time [4]
  C (control) _____ 19
  D (adduct) _____ 43

[4] Minutes to 10 point rise, small rotor, 250°, ASTM D–1646–61.

From the above it may be understood that certain benefits in process safety may be obtained by the use of adducts of resorcinol and catechol with magnesia in rubber vulcanizing stocks. Similar benefits may be observed with other phenolic adducts and in other elastomer formulations. Suitable elastomers include natural rubber, synthetic rubber, so-called natural synthetic rubbers, acrylic rubbers, silicone rubbers, butyl rubbers, and the like. The adducts may also be used in conjunction with other elastomers and vulcanizing agents, either in mixture or reacted on the same substrate. An example of this latter class of materials is an adduct of catechol and di-o-tolyl guanidine with magnesia which gives excellent results as an accelerator composition, as compared to a mixture of these three materials. These adducts also have utility as antioxidants in elastomers.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. A process for preparing an organically modified magnesia which comprises admixing in a solvent medium at a temperature between about 0° C. and 225° C. a magnesia having an iodine absorption number of from 10 to 300 with a compound of the formula

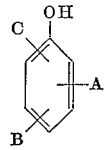

and

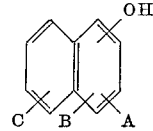

wherein A, B and C are independently selected from the group consisting of hydrogen, hydroxy, halogen, lower alkyl, aryl, lower alkoxy, aryloxy, nitro and amino, wherein said compounds contain from 6 up to 18 carbon atoms and recovering an organically modified magnesia product having an organic content derived from said compound of from 1 to 35 percent by weight.

2. The product of the process of claim 1.

3. The product of claim 1 wherein the contacting is carried out under substantially anhydrous conditions.

4. The process of claim 1 wherein the magnesia has an iodine adsorption number of from 15 to 220.

5. The process according to claim 1 wherein the aryl hydroxy compound is catechol.

6. The process of claim 1 wherein the product has an organic content of from 2.5 to 25 percent by weight.

7. The process of claim 1 wherein the compound is resorcinol.

8. The process of claim 1 wherein the compound is phloroglucinol.

9. A process for preparing an organically modified magnesia which comprises admixing in a fluid bed at a temperature between about 0° C. and 225° C. a magnesia having an iodine absorption number of from 10 to 300 with a compound of the formula

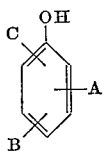

and

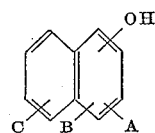

wherein A, B and C are independently selected from the group consisting of hydrogen, hydroxy, halogen, lower alkyl, aryl, lower alkoxy, aryloxy, nitro and amino, wherein said compounds contain from 6 up to 18 carbon atoms and recovering an organically modified magnesia product having an organic content derived from said compound of from 1 to 35 percent by weight.

References Cited by the Examiner

UNITED STATES PATENTS

| | | | |
|---|---|---|---|
| 2,739,075 | 3/56 | Iler | 106—308 |
| 2,973,282 | 2/61 | Gross | 106—288 |

TOBIAS E. LEVOW, *Primary Examiner.*